United States Patent [19]
Vinohradsky

[11] Patent Number: 5,219,376
[45] Date of Patent: Jun. 15, 1993

[54] APPARATUS AND METHOD FOR MOUNTING AN EDM ELECTRODE

[75] Inventor: John M. Vinohradsky, Sussex, Wis.

[73] Assignee: Zuelkze Tool & Engineering Company, Inc., Milwaukee, Wis.

[21] Appl. No.: 828,415

[22] Filed: Jan. 31, 1992

[51] Int. Cl.⁵ ............... H01R 43/00; C25B 11/00; B23K 9/16

[52] U.S. Cl. .................. 29/825; 204/286; 219/69.11; 219/69.15

[58] Field of Search ........... 29/825; 219/69.15, 69.11; 204/286, 297 R

[56] References Cited

U.S. PATENT DOCUMENTS

| | | | |
|---|---|---|---|
| 3,474,215 | 10/1969 | Johanson | 219/69.15 |
| 4,316,071 | 2/1982 | Bonga | 219/69.11 |
| 4,395,613 | 7/1983 | Barr et al. | 204/286 X |
| 4,922,074 | 5/1990 | Sebzda, Sr. | 219/69.15 |

FOREIGN PATENT DOCUMENTS 266570  5/1988  European Pat. Off. ......... 219/69.15

Primary Examiner—Carl J. Arbes
Attorney, Agent, or Firm—Andrus, Sceales, Starke & Sawall

[57] ABSTRACT

An EDM electrode holder includes a system for fixing the lateral position of the electrode relative to the holder, to allow an operator to substantially reduce set up time in mounting an EDM electrode to an EDM machine. The lateral positioning arrangement includes a series of pins provided on the electrode holder in predetermined locations, and a series of openings formed in the electrode in locations corresponding to that of the pins. The pins are received within the openings to laterally position the electrode, and the electrode is then secured to the holder.

16 Claims, 2 Drawing Sheets

APPARATUS AND METHOD FOR MOUNTING AN EDM ELECTRODE

BACKGROUND AND SUMMARY

This invention pertains to electrical discharge machining, typically referred to "EDM", and more particularly to an apparatus and method for mounting an EDM electrode to an EDM machine.

Broadly, the EDM process employs an electrode which is brought into contact with a workpiece to form a cavity in the workpiece. The electrode is machined to provide an desired shape, corresponding to the final desired shape of the cavity. The EDM process is typically employed to manufacture tools and dies.

In the EDM process, setting up of the EDM electrode on the EDM machine is a critical step. The electrode must be properly positioned in the horizontal X and Y axes, as well as in the vertical Z axis. The electrode is typically mounted to an electrode holder, which includes a stem adapted to be received within a hydraulic quick clamp holder, which is then mounted to a chuck or the like. The electrode must be carefully positioned relative to the electrode holder, to ensure that the electrode is properly positioned relative to the EDM machine. In the past, this has been a time-consuming and difficult step in the setting-up process.

Various ways of mounting the electrode to the electrode holder are known. For instance, the electrode can be soldered to a flat end of the electrode holder, or the electrode may be provided with a recess adapted to receive the end of the holder, with the electrode being glued in place on the holder. Alternatively, a threaded opening can be formed in the electrode to receive a male threaded projection provided on the electrode holder, or horizontal passages formed in the electrode, through which threaded fasteners extend to fix the electrode to the electrode holder. One such arrangement provides a vertical flat surface against which a flat inner surface of the electrode is engaged, with bolts extending through the electrode and into threaded openings formed in the vertical flat surface of the electrode holder. While the last-described mounting arrangement provides positioning of the flat surface of the electrode in one horizontal direction, there is nothing in the prior art which discloses any means for positioning the electrode in the other horizontal direction when the electrode is being mounted to the electrode holder.

Accordingly, it is an object of the present invention to provide an electrode holder which is capable of properly positioning the electrode in both horizontal axes when the electrode is mounted to the holder. It is a further object of the invention to provide a system for positioning the electrode in both horizontal axes which is simple to carry out and which provides accurate and reliable positioning of the electrode on the holder. It is a further object of the invention to provide an arrangement for modifying the electrode to allow the electrode to interface with the electrode holder to provide accurate positioning of the electrode on the electrode holder along both horizontal axes.

In accordance with one aspect of the invention, the EDM electrode is provided with a substantially flat surface located toward its inner end, and an electrode holder includes an electrode-mounting block to which the electrode is adapted to be secured. The block includes a substantially vertical flat mounting surface adapted to engage the flat inner surface of the electrode. A mounting arrangement, such as a stem, is secured to the block for mounting the block to an EDM machine in a predetermined position along a longitudinal, or vertical, axis. A lateral positioning arrangement is interposed between the flat surface of the electrode and the flat vertical mounting surface of the block, for locating the electrode in a predetermined position along an axis transverse to the longitudinal axis and parallel to the flat vertical mounting surface of the block, and a connection arrangement is provided for connecting the electrode to the block. The flat vertical mounting surface of the block is located at a predetermined offset from the longitudinal axis, to allow the electrode to be located in a predetermined position along a second horizontal axis, perpendicular to the flat vertical mounting surface of the block. The lateral positioning arrangement includes one or more pins which extend outwardly from the flat vertical mounting surface of the block in a predetermined position relative to the longitudinal axis. One or more openings are formed in the electrode in predetermined positions toward its inner end, corresponding in location to the locations of the one or more pins. The pins are engageable within the openings when the flat surface of the electrode is engaged with the flat vertical mounting surface of the block, to position the electrode along an axis transverse to the longitudinal axis. In a preferred form, one of the pins is offset from the other of the pins in a direction along the longitudinal axis, and the openings in the electrode are in a corresponding pattern, to ensure that the proper surface of the inner end of the electrode is engaged with the flat mounting surface of the block.

In accordance with another aspect of the invention, a holder for an EDM electrode is constructed substantially in accordance with the foregoing summary.

The invention further contemplates a method of mounting an EDM electrode to an EDM electrode holder. The method involves the steps of providing a lateral positioning arrangement between the flat surface of the electrode and the flat mounting surface of the electrode holder, to locate the electrode in a predetermined position along an axis transverse to the longitudinal axis and parallel to the flat vertical mounting surface of the electrode holder, and securing the electrode to the electrode holder. The step of providing a lateral positioning arrangement is substantially as summarized previously, i.e. providing one or more pins which extend outwardly from the flat vertical mounting surface of the electrode holder, and one or more openings in the electrode engageable with the one or more pins. The step of forming one or more openings in the electrode is preferably carried out by maintaining the electrode in a predetermined position in a jig prior to mounting the electrode to the electrode holder. The jig has one or more passages in locations corresponding to the pattern of the one or more pins, and a boring tool is inserted through the passages in the jig to form the one or more openings which are adapted to receive the one or more pins. The jig is preferably constructed of two sections which cooperate to define a slot adapted to receive the electrode, with the sections being movable toward and away from each other between a clamping position and a release position. The electrode is placed in the slot when the jig sections are in their release position, and the sections are then moved to their clamping position to engage the electrode and to maintain it in position within the slot.

Various other features, objects and advantages of the invention will be made apparent from the following description taken together with the drawings.

DETAILED DESCRIPTION OF THE INVENTION

Figure 1:
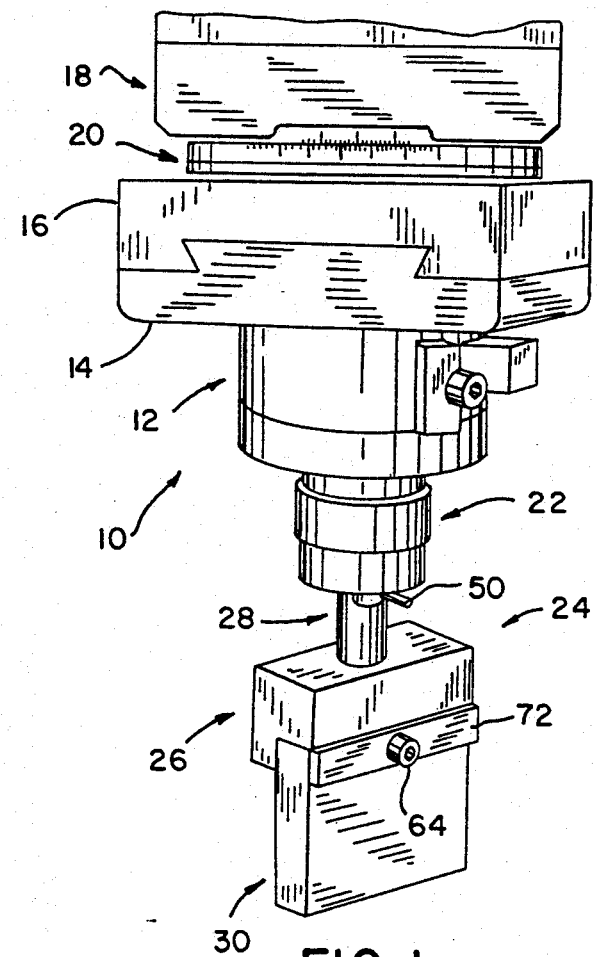

FIG. 1 illustrates a portion of an EDM machine 10 including an electromagnetic chuck 12 having an upper plate 14 engageable with lower plate 16 of a hydraulically locking rotatable quick clamp holder 18, which includes a scale 20 for indicating the angle of orientation of chuck 12 relative to machine 10. A hydraulic quick clamp 22 is mounted to the underside of chuck 12, and includes a vertical passage.

An EDM electrode holder 24 broadly includes a block 26 and an upstanding stem 28, which is adapted to be received within the vertical passage of hydraulic quick clamp 22. An EDM electrode 30 is engaged with and mounted to block 26, in a manner to be explained.

In accordance with known EDM machine operation, electrode 30 is employed to form a cavity in a workpiece when it is lowered by machine 10 into engagement with the workpiece.

Figure 2:
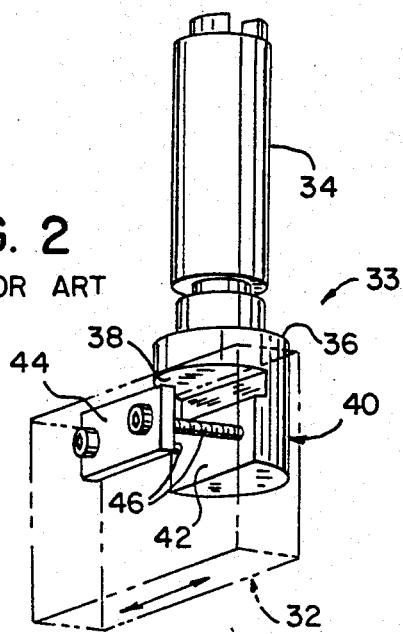

FIG. 2 illustrates a prior art arrangement for mounting an EDM electrode, shown at 32, to an EDM machine. In this arrangement, an electrode holder 33 includes a stem 34 adapted to be received within the vertical passage of hydraulic quick clamp 22. Stem 34 is connected to a base 36 which includes a flat undersurface 38, with a mounting portion 40 extending downwardly from base 36. Mounting portion 40 includes a flat vertical surface 42, within which a pair of spaced threaded openings are formed. The flat upper surface of electrode 32 is engageable with flat undersurface 38 of base 36, and the flat side surface of electrode 32 is engageable with flat vertical surface 42 of mounting portion 40. A mounting plate 44 is placed on the opposite side of electrode 32, and a pair of threaded screws 46 extend through spaced openings formed in electrode 32, with the heads of bolts 46 engaging plate 44 to securely mount electrode 32 to electrode holder 33. In the mounting arrangement of FIG. 2, the horizontal position of electrode 32 along the axis parallel to the plane defined by flat vertical surface 42 is determined by the location of the openings in electrode 32 through which screws 46 extend. Accordingly, it is up to the operator to carefully position such passages to ensure that electrode 32 is properly positioned when it is mounted to EDM machine 10.

Figure 3:
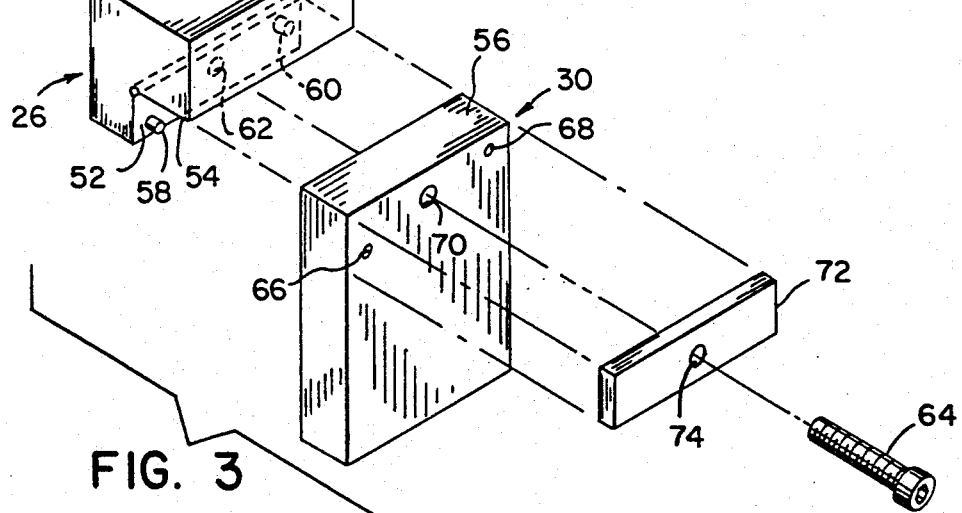

Referring to FIG. 3, electrode holder 24 constructed according to the invention includes block 26 and stem 28, as set forth previously. The lower end of stem 28 is welded to upper surface 48 of block 26, and a positioning pin 50 extends through stem 28 for providing proper angular alignment of holder 24 when stem 28 is received within the vertical passage of hydraulic quick clamp 22.

Electrode 30 as illustrated is tooled from a stock electrode blank. Such stock blanks are typically supplied in ¼ and ½ inch thickness, and have widths ranging from one inch to five inches, in 0.0002 inch increments. Electrode 30 as illustrated has a width of two inches. The width of block 26 is identical to that of electrode 30.

Block 26 defines a flat vertical mounting surface 52, which is oriented parallel to the longitudinal vertical axis defined by stem 28. Vertical mounting surface 52 is adapted to be engaged by the upper portion of flat side surface 53 (FIG. 4) of electrode 30. In addition, block 26 defines a horizontal downwardly facing mounting surface 54 (FIGS. 3, 4), which is adapted to be engaged by flat upper surface 56 of electrode 30.

Figure 4:
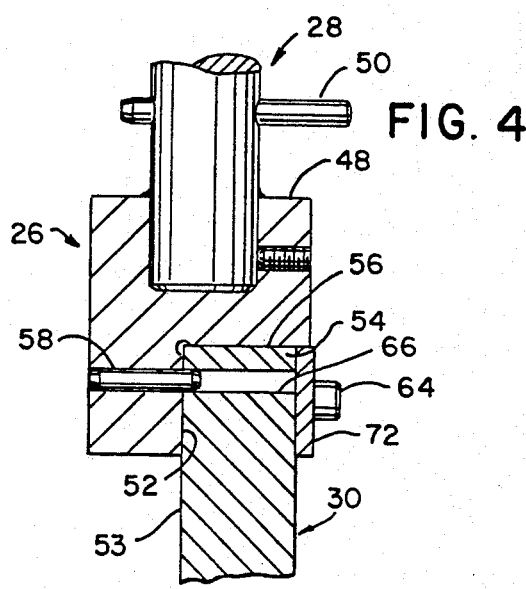

A pair of pins 58, 60 extend outwardly from flat vertical mounting surface 52. As shown in FIG. 4, pin 58 is press-fit into a horizontal passage which opens onto vertical mounting surface 52, extending outwardly therefrom. Pin 60 is similarly mounted within a passage formed in block 26.

One or more horizontal threaded passages, such as passage 62, extend through the depending portion of block 26 below downwardly facing horizontal surface 54. Threaded passage 62 is substantially centrally located vertically and horizontally on vertical mounting surface 52 between pins 58, 60, and is adapted to receive the threaded shank of a bolt 64. As an increasing width of electrode 30 is employed, additional threaded passages extend through the depending portion of block 26, which is provided with a correspondingly increasing width, below downwardly facing horizontal surface 54. Such additional passages are symmetrically located horizontally and vertically on vertical mounting surface 52 outside pins 58, 60, and are adapted to receive the threaded shanks of additional screws, such as screw 64 as illustrated.

Pins 58 and 60 are offset from each other in a vertical direction. As shown in FIG. 3, pin 58 is at a lower elevation on vertical mounting surface 52 than pin 60.

Electrode 30 is provided with a pair of passages 66, 68 extending therethrough. Passage 66 is adapted to receive pin 58, while passage 68 is adapted to receive pin 60. Passages 66, 68 are vertically offset from each other in an amount identical to that of pins 58, 60, and the horizontal distance between passages 66, 68 is identical to the horizontal distance between pins 58, 60.

Electrode 30 is further provided with an unthreaded central passage 70 located between passages 66 and 68, which is adapted to receive the threaded shank of screw 64.

With the arrangement as shown in FIGS. 3 and 4, electrode 30 is mounted to block 26 of holder 24 by moving electrode 30 horizontally toward vertical mounting surface 52 until pins 58, 60 are engaged within passages 66, 68, respectively. Plate 72 is placed against the opposite side surface of electrode 30, and bolt 64 is inserted through an opening 74 formed in plate 72, and through opening 70 in electrode 30 and threadedly engaged with the internal threads provided by threaded passage 62 formed in block 26.

Vertical mounting surface 52 of block 26 is located at a predetermined offset from the longitudinal axis defined by stem 28. With electrode 30 having a width of ½ inch, the offset is ¼ inch, so that electrode 30 is centered along an axis perpendicular to the plane of vertical mounting surface 52. This feature in combination with pins 58, 60 engaging passages 66, 68 in electrode 30, centers electrode 30 in both horizontal directions relative to the longitudinal axis defined by stem 28. In this manner, the position of the lower end of electrode 30 is centered and fixed relative to stem 28, and thereby relative to EDM machine 10 when stem 28 is mounted within the vertical passage of hydraulic quick clamp 22. Such positioning of electrode 30 in both horizontal directions eliminates a substantial amount of set up time for the operator.

The vertical offset of pins 58, 60, and likewise of passages 66, 68 in electrode 30 ensures that the proper side of electrode 30 is positioned against vertical mounting surface 52 of block 26. That is, if electrode 30 were improperly positioned, pins 58, 60 would not be received within passages 66, 68, and the operator would know to reverse the position of electrode 30.

Figure 5:
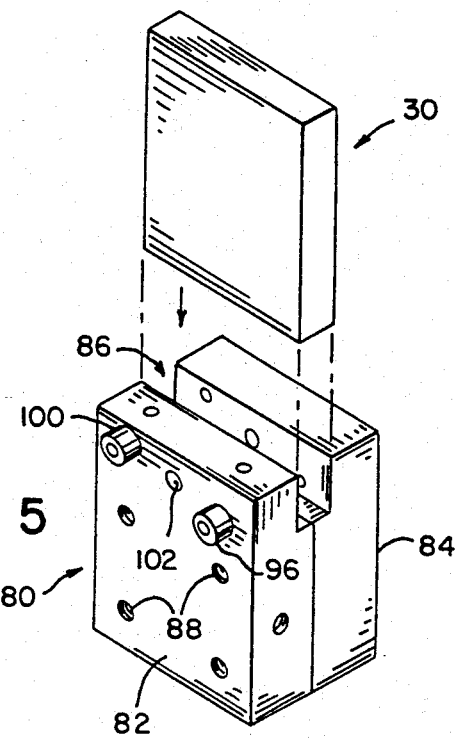
Figure 6:
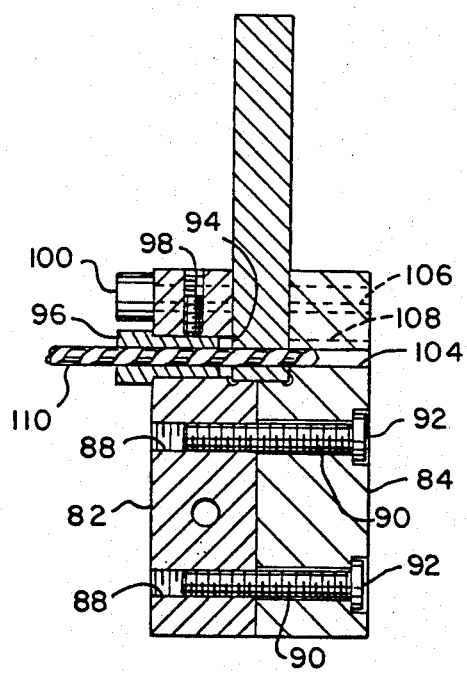
Figure 7:
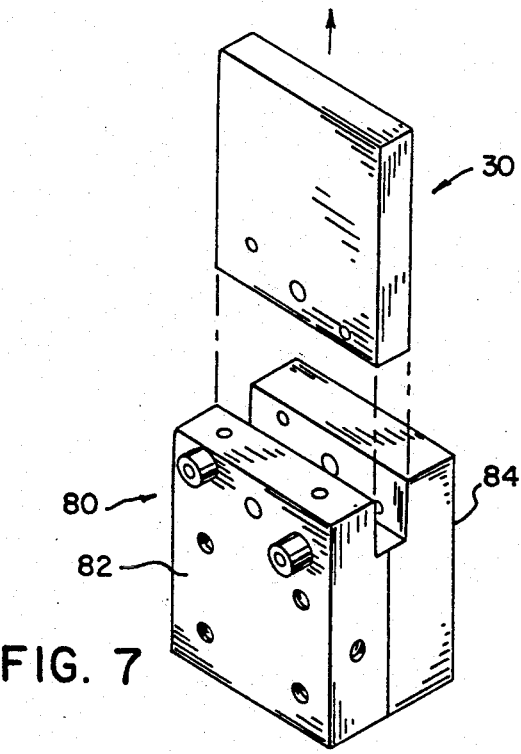

FIGS. 5–7 show a jig 80 adapted to be employed in forming passages 66–68 in electrode 30.

Referring to FIG. 5, jig 80 consists of a pair of jig sections 82, 84, each of which includes a facing cut-out portion at its top which cooperate to define a slot 86 when sections 82, 84 are secured together. In FIGS. 5–7, slot 86 has a width of slightly less than ¼ inch to receive electrode 30, which has a thickness of ¼ inch. When a ⅛ inch thick electrode is employed, the cut-out portion is provided in either one or the other of jig sections 82, 84, to provide a width of slightly less than ⅛ inch to slot 86.

As shown in FIG. 6, section 82 includes a series of threaded passages 88, and section 84 includes a series of aligned countersunk passages 90. Screws 92 extend through passages 90 formed in section 84 and into threaded passages 88, for selectively moving sections 82, 84 between a clamping position, as shown in FIG. 6, and a release position in which sections 82, 84 are moved away from each other.

Section 82 includes a pair of passages, one of which is shown at 94, formed in its upper end opening into the interior of slot 86. A collar member 96 is engaged within passage 94, and is maintained in position by a set screw 98. Similarly, a collar 100 is engaged within the other of the passages formed in jig section 82. A passage 102 is located between collars 96, 100.

Jig section 84 includes a passage 104 having a diameter larger than that of the passage extending through collar 96, and axially aligned therewith, to allow the downwardly outflow of graphite debris from electrode 30. Similarly, a passage 106 is formed in jig section 84 in alignment with the passage through collar 100. A passage 108 is located between passages 104, 106, in alignment with passage 102 formed in jig section 82.

Jig 80 is constructed so as to have a width corresponding to that of preformed electrode blank 30. Accordingly, in the illustrated example, jig sections 82, 84 each have a width of two inches.

To form passages 66–70 in electrode 30, the operator first turns screws 92 so as to separate jig sections 82, 84, allowing electrode blank 30 to be placed into slot 86. Once the sides of electrode blank 30 are aligned flush with the sides of jig sections 82, 84, the operator turns screws 92 down to move jig sections 82, 84 together, thereby engaging the portions of electrode blank 30 received within slot 86 and clamping the lower portion of electrode blank 30 within slot 86. The operator then employs a drill 110, passing it through the passage of collar 96 and the material of electrode blank 30, until it is received within passage 104 in jig section 94, to form passage 68 in electrode blank 30. The operator then employs drill 110 in the same manner through the passage of collar 100, to form passage 66 in electrode blank 30. A reamer (not shown) is then employed to ensure the exact desired size of passages 66, 68. A larger bit is then used to form passage 70 through electrode blank 30, utilizing passages 102, 108 formed in jig sections 82, 84, respectively. Screws 92 are then turned so as to release the clamping force exerted by jig sections 82, 84 on electrode 30, and electrode 30 is withdrawn as shown in FIG. 7.

The locations of passages 66, 68 in electrode blank 30 correspond to the locations of pins 58, 60 in block 26, so that electrode 30 can then be mounted to block 26 in the same manner as described previously.

The invention contemplates that any number of pins, in any predetermined pattern, can be employed to fix the lateral position of electrode 30 relative to block 26, as long as the same pattern of openings is formed in the electrode to receive the pin pattern. For example, for wider electrodes a series of three pins could be employed.

In addition, any number of passages can be formed in the electrode to receive the threaded screws for use in mounting the electrode to the block.

With the system as shown and described, a standard jig is constructed for each width of stock electrode blanks, and is used to pre-form the locating and screw-receiving openings in electrode blanks having a corresponding predetermined width.

Alternatively, jig section 82 can be used alone to pre-form openings on a non-stock electrode, to allow such an electrode to be mounted to block 26 of electrode holder 24. This is accomplished by first positioning jig section 82 on the non-stock electrode, and then employing a clamping pliers tool to temporarily secure jig section 82 to the electrode, to allow the locating and screw-receiving openings to be formed in the electrode as described above. Once the openings are formed, the clamping pliers are released to release jig section 82, and the electrode is mounted to electrode holder 24 in the same manner as described previously.

As can be appreciated, the lateral positioning of an electrode relative to the mounting stem allows an operator to know the precise location of the end of the electrode in both the horizontal axes once the electrode is mounted to electrode holder 24.

Various alternatives and embodiments are contemplated as being with the scope and spirit of the following claims particularly pointing out and distinctly claiming the subject matter regarded as the invention.

I claim:

1. A mounting device for mounting an EDM electrode to an EDM machine, the electrode having an outer working end and an inner end and having a substantially flat surface located toward its inner end, the mounting device comprising:

an electrode-mounting block including a substantially flat mounting surface for engaging the substantially flat surface of the electrode;

mounting means for mounting the block to the EDM machine in a predetermined position along a longitudinal axis;

first lateral positioning structure on the substantially flat surface of the electrode;

second lateral positioning structure on the substantially flat mounting surface of the block;

wherein the first and second lateral positioning structures are engageable with each other and function to locate the electrode in a predetermined position along an axis transverse to the longitudinal axis and parallel to the substantially flat mounting surface of the block; and connection means for connecting the electrode to the block.

2. The device of claim 1, wherein the substantially flat mounting surface of the electrode-mounting block is located at a predetermined offset from the longitudinal axis, so as to locate the electrode in a predetermined offset from the longitudinal axis, so as to locate the electrode in a predetermined position along a second axis perpendicular to the substantially flat mounting surface of the block.

3. The device of claim 1, wherein the mounting means comprises a stem extending from the electrode-mounting block along the longitudinal axis, the stem being received within a mounting mechanism associated with the EDM machine.

4. The device of claim 1, wherein the second lateral positioning structure comprises one or more pins extending outwardly from the substantially flat mounting surface of the block in a predetermined position relative to the longitudinal axis, and wherein the first lateral positioning structure comprises one or more openings formed in the electrode located in predetermined positions toward the inner end of the electrode, the openings corresponding in location to that of the one or more pins, wherein the one or more pins are engageable with the one or more openings when the flat surface of the electrode is engaged with the substantially flat mounting surface of the electrode-mounting block to position the electrode thereon and transverse to the longitudinal axis.

5. The device of claim 4, wherein at least one of the pins is offset from another of the pins in a direction along the longitudinal axis, and wherein the one or more openings in the inner end of the electrode are in locations corresponding to that of the pins, to ensure that the proper surface of the inner end of the electrode is engaged with the substantially flat mounting surface of the electrode-mounting block.

6. The means of claim 1, wherein the connection means for connecting the electrode to the block comprises one or more threaded fasteners extending through one or more openings formed in the electrode.

7. A holder for an EDM electrode, the electrode having an outer working end and an inner end including a substantially flat surface, comprising:
an electrode-mounting block to which the inner end of the electrode is adapted to be secured, the block including a substantially flat mounting surface for engaging the substantially flat surface of the electrode;
mounting means for mounting the block to an EDM machine in a predetermined position along a longitudinal axis; and
lateral positioning means on the substantially flat surface of the block for engaging the electrode and for locating the electrode on the substantially flat mounting surface of the block in a predetermined position along an axis transverse to the longitudinal axis and parallel to the substantially flat mounting surface of the block.

8. The holder of claim 7, wherein the lateral positioning means comprises one or more pins extending outwardly from the substantially flat mounting surface of the block in a predetermined position relative to the longitudinal axis, and one or more openings in the electrode located in predetermined positions toward its inner end corresponding to the locations of the one or more pins, wherein the one or more pins are engageable with the one or more openings when the flat surface of the electrode is engaged with the substantially flat mounting surface of the electrode-mounting block, to position the electrode along the axis transverse to the longitudinal axis.

9. The holder of claim 8, wherein at least one of the pins is offset from another of the pins in a direction along the longitudinal axis, and wherein the one or more openings provided in the inner end of the electrode are in locations corresponding to that of the pins, to ensure that the proper surface of the inner end of the electrode is engaged with the substantially flat mounting surface of the electrode-mounting block.

10. A method of mounting an EDM electrode to an EDM electrode holder, the electrode having a substantially flat surface located toward its inner end and the electrode holder having a substantially flat mounting surface and a mounting stem extending along a longitudinal axis, comprising the steps of:
providing first lateral positioning structure on the substantially flat surface of the electrode;
providing second lateral positioning structure on the substantially flat mounting surface of the electrode holder;
engaging the first and second lateral positioning structures with each other for locating the electrode in a predetermined position along an axis transverse to the longitudinal axis and parallel to the substantially flat mounting surface of the electrode holder; and
securing the electrode to the electrode holder.

11. The method of claim 10, wherein the step of providing second lateral positioning structure comprises providing one or more projections extending outwardly from the substantially flat mounting surface of the electrode holder, and wherein the step of providing first lateral positioning structure comprises providing one or more openings in the electrode, the openings being engageable with the one or more projections.

12. The method of claim 11, wherein the step of providing one or more projections comprises inserting one or more pins into one or more passages formed in the block such that an end of each pin extends outwardly from the substantially flat mounting surface of the electrode holder.

13. The method of claim 11, wherein the step of providing one or more projections comprises positioning a pair of projections extending outwardly from the substantially flat mounting surface of the electrode holder such that one projection is offset relative to the other projection in a direction along the longitudinal axis, and wherein the step of providing one or more openings in the electrode holder comprises positioning a pair of openings in a pattern corresponding to that of the pair of projections, to ensure that the proper surface of the electrode is positioned against the substantially flat mounting surface of the electrode holder.

14. The method of claim 11, wherein the step of forming one or more openings in the electrode comprises maintaining the electrode in a predetermined position in a jig having one or more passages in locations corresponding to the pattern of the one or more projections, and inserting a boring tool through the passages in the jig to form one or more openings adapted to receive the one or more projections.

15. The method of claim 14, wherein the step of maintaining the electrode in the jig comprises constructing the jig of two sections which cooperate to define a slot adapted to receive the electrode, the sections being movable toward and away from each other between a clamping position and a release position; placing the electrode in the slot; and moving the jig sections to their clamping position to engage the electrode and to maintain it in position with the slot.

16. A system for mounting an EDM electrode to an EDM machine, the electrode including an outer working end and an inner end, and having a substantially flat surface formed toward its inner end, comprising:

an electrode holder including a substantially flat mounting surface for engaging the substantially flat surface of the electrode; connection means for connecting the electrode holder to the EDM machine in a predetermined position along a longitudinal axis; and one or more lateral positioning pins extending outwardly from the substantially flat mounting surface in a predetermined position relative to the longitudinal axis; and a jib for use in forming one or more openings in the substantially flat surface of the electrode, including a shoulder for engaging the inner end of the electrode, an upstanding portion extending upwardly from the shoulder including a substantially flat surface for engaging the substantially flat surface of the electrode, and one or more passages extending through the upstanding portion in locations corresponding to the locations of the one or more lateral positioning pins;

whereby the inner end of an electrode is engageable with the shoulder, and when the electrode is secured in position thereon, one or more openings are formed in the electrode by boring through the one or more passages in the jig and into the electrode, to allow the electrode to be laterally positioned on the electrode holder by engaging the one or more pins within the one or more openings.

* * * * *

UNITED STATES PATENT AND TRADEMARK OFFICE
CERTIFICATE OF CORRECTION

PATENT NO. : 5,219,376
DATED : June 15, 1993
INVENTOR(S) : JOHN M. VINOHRADSKY It is certified that error appears in the above-identified patent and that said Letters Patent is hereby corrected as shown below:

Claim 2, col. 6, line 67-68, delete "offset from the longitudinal axis, so as to locate the electrode in a predetermined"; Claim 6, col. 7, line 31, delete "means" and substitute therefor -- device --; Claim 16, col. 9, line 12, delete "jib" and substitute therefor -- jig --.

Signed and Sealed this

Eighteenth Day of January, 1994

*Attest:*

BRUCE LEHMAN

*Attesting Officer*     *Commissioner of Patents and Trademarks*